(12) United States Patent
Lauterbach et al.

(10) Patent No.: US 9,855,540 B2
(45) Date of Patent: Jan. 2, 2018

(54) FLEXIBLE FUEL CONVERTER FOR PRODUCING LIQUEFIED PETROLEUM GAS FROM TRANSPORTATION FUELS

(71) Applicants: Jochen Lauterbach, Columbia, SC (US); Erdem Sasmaz, Columbia, SC (US); Sungtak Kim, Columbia, SC (US); Michael Kai Mayeda, Columbia, SC (US)

(72) Inventors: Jochen Lauterbach, Columbia, SC (US); Erdem Sasmaz, Columbia, SC (US); Sungtak Kim, Columbia, SC (US); Michael Kai Mayeda, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 14/495,182

(22) Filed: Sep. 24, 2014

(65) Prior Publication Data

US 2015/0086438 A1    Mar. 26, 2015

Related U.S. Application Data

(60) Provisional application No. 61/881,514, filed on Sep. 24, 2013.

(51) Int. Cl.
*B01J 8/06* (2006.01)
*B01J 19/24* (2006.01)
(Continued)

(52) U.S. Cl.
CPC ............. *B01J 8/065* (2013.01); *B01J 8/0207* (2013.01); *B01J 8/067* (2013.01); *B01J 19/243* (2013.01);
(Continued)

(58) Field of Classification Search
CPC ........ B01J 19/24; B01J 19/2445; B01J 8/062; B01J 8/065; B01J 2219/00013;
(Continued)

(56) References Cited

U.S. PATENT DOCUMENTS

| | | | | |
|---|---|---|---|---|
| 2,440,822 A | * | 5/1948 | Hachmuth | ................ C07C 2/10 208/78 |
| 2013/0041198 A1 | * | 2/2013 | Lauterbach | ............ C10G 11/05 585/653 |

OTHER PUBLICATIONS

Hendershot, R.J.; Lasko, S.S.; Fellmann, M.F.; Oskarsdottir, G.; Delgass, W.N.; Snively, C.M.; Lauterbach, J.; *Appl. Catal. A-Gen* 254 (2003) 107-120.

(Continued)

*Primary Examiner* — Lessanework Seifu
(74) *Attorney, Agent, or Firm* — Dority & Manning, PA

(57) ABSTRACT

Fuel converters configured to convert a transportation fuel to a low-C hydrocarbon fuel, along with methods of their use, are provided. The fuel converter can comprise: an evaporator configured to receive a transportation fuel from a fuel tank in a liquid state, wherein the evaporator converts the transportation fuel from a liquid to a gas; a fuel burner configured to heat the evaporator; a catalyst cartridge in fluid communication with the evaporator so as to receive the gas from the evaporator; and a condenser in fluid communication with the catalyst cartridge so as to receive the reaction product mixture from the catalyst cartridge. The catalyst cartridge comprises a catalyst configured to convert the transportation fuel into a reaction product mixture comprising a low-C hydrocarbon fuel. The condenser is configured to separate the low-C hydrocarbon fuel from a condensed fuel in the reaction product mixture.

19 Claims, 1 Drawing Sheet

(51) Int. Cl.
  *B01J 8/02*   (2006.01)
  *C10G 31/06*  (2006.01)
  *C10L 3/12*   (2006.01)
(52) U.S. Cl.
  CPC .............. *C10G 31/06* (2013.01); *C10L 3/12* (2013.01); *B01J 2208/0053* (2013.01); *B01J 2208/00504* (2013.01); *B01J 2219/00006* (2013.01); *B01J 2219/0009* (2013.01); *B01J 2219/00092* (2013.01); *B01J 2219/00099* (2013.01); *B01J 2219/00108* (2013.01); *B01J 2219/00157* (2013.01)
(58) Field of Classification Search
  CPC .... B01J 2219/00022; C07C 4/06; C07C 7/09; C10L 3/12
  See application file for complete search history.

(56) References Cited

OTHER PUBLICATIONS

Hendershot, R.J.; Snively, C.M., Lauterbach, J.; *Chem.-Eur. J.* 11 (2005) 806-814.
Ryu, J.; "Catalytic Cracking of Diesel Fuel for Army Field Burners. Part 1 Feasibility of Producing Gaseous Fuel From Diesel Fuel Via Catalytic Cracking". *U. S. Army Soldier and Biological Chemical Command Soldier Systems Center* (1999).
Ibrahim, H.H.; Idem, R.O.; *Chem. Eng. Sci.* 62 (2007) 6582-6594.

\* cited by examiner

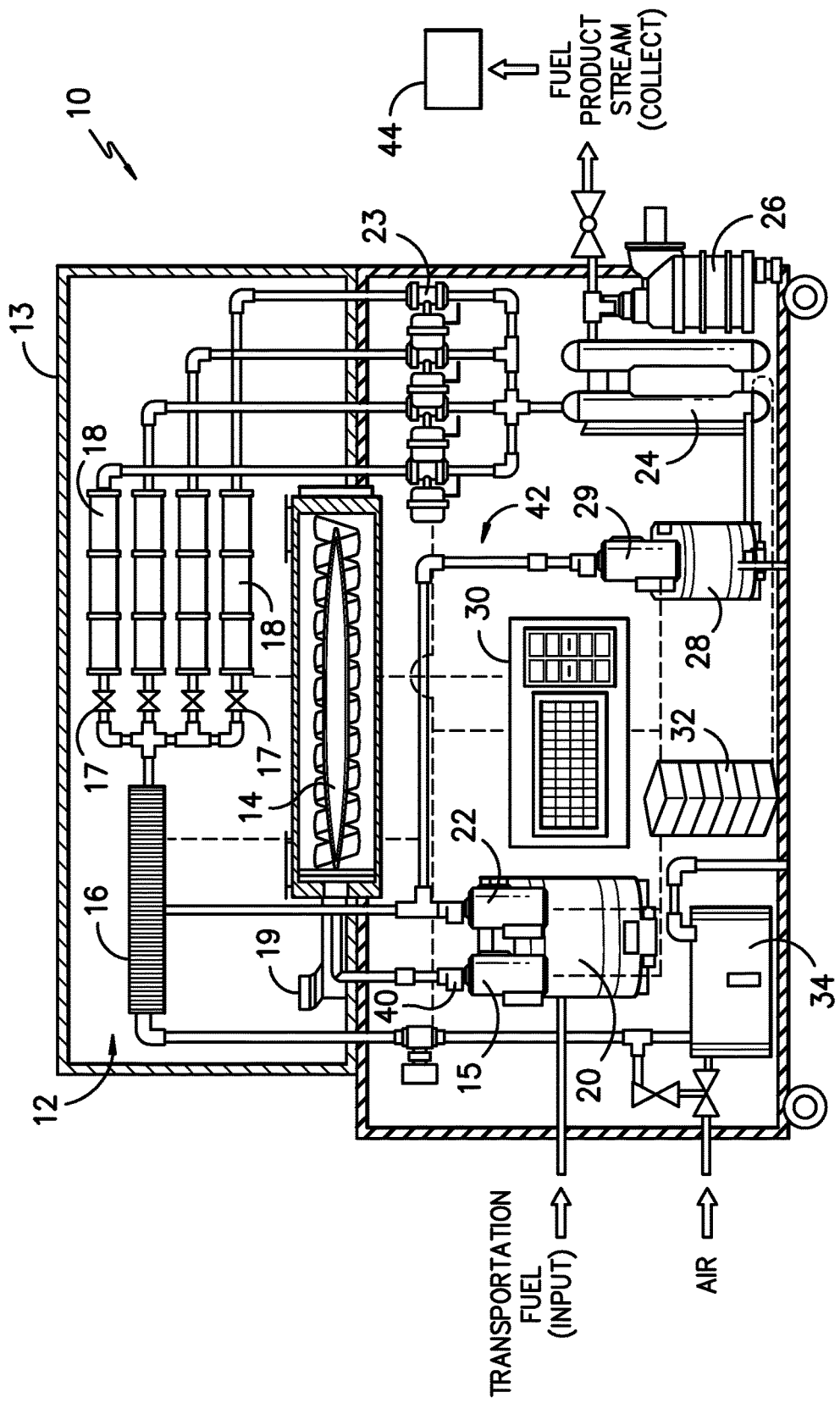

FLEXIBLE FUEL CONVERTER FOR PRODUCING LIQUEFIED PETROLEUM GAS FROM TRANSPORTATION FUELS

PRIORITY INFORMATION

The present application claims priority to U.S. Provisional Patent Application Ser. No. 61/881,514 titled "Flexible Fuel Converter for Producing Liquefied Petroleum Gas from Transportation Fuels" of Lauterbach, et al. filed on Sep. 24, 2013, the disclosure of which is incorporated by reference herein.

BACKGROUND

Aviation fuel, kerosene, diesel, and gasoline generally contain a mixture of high-C hydrocarbons with carbon chains of 6 to 22 carbon atoms per molecule (e.g., between 6 and 16 carbon atoms per molecule). For example, Jet propellant 8 (JP-8) is a kerosene-based aviation fuel, specified in 1990 by the U.S. government as a replacement fuel for diesel-fueled vehicles. Commercial aviation uses a similar mixture under the name Jet-A, and the U.S. Navy uses a similar formula, under the name JP-5. In addition to powering aircraft and other tactical vehicles, JP-8 is also widely used to fuel heaters and generators. Thus, a strong advantage of JP-8 is its widespread existing supply infrastructure and distribution network. The use of a single fuel greatly simplifies logistics planning for military installations and operations.

Similar to JP-8, commercial fuels (e.g., diesel, kerosene, and gasoline) enjoy widespread use in transportation and auxiliary power generation. These high-C hydrocarbons have large energy densities by mass and volume. Therefore, the hydrocarbon fuels are convenient methods to store and transport energy to the end user. Developed countries have extensive distribution infrastructures that allow customers to purchase hydrocarbon fuels with ease and convenience.

Despite the effectiveness of high-C hydrocarbon fuels to supply power, low-C hydrocarbon fuels (e.g., liquefied petroleum gas (LPG)) are often needed for traditional and emerging technologies in remote regions where grid-sourced electric power is unreliable or unavailable. Such circumstances include emergency response situations, rural settings, sea expeditions, and military operations. Hence, catalytic cracking of gasoline, diesel and kerosene to LPG has drawn attention due to its distinct advantages as a portable energy source with better flexibility and higher efficiency for point-of-use devices like solid oxide fuel cells (SOFC), burners, stoves, refrigerators, or lanterns. Other LPG uses include portable back-up power, autogas, or fuel for in-field operations such as health clinics, lighting, commercial gas appliances, or primary power for small-scale applications.

Diesel generators have been employed to fill gaps left by the absence or inconsistency of grid power in rural settings. Batteries are another alternative that can be sized to a range of systems: from a pacemaker to renewable energy systems. Despite their popularity, generators and batteries exhibit significant drawbacks in the aforementioned settings; single-fuel reliance, noise pollution, exhaust emissions, and mechanical vibrations from diesel generators limit their use in close proximity with people. Inherently low energy densities in batteries (0.1-0.3 MJ/L) lead to short run times or bulky systems.

The development of SOFC capable of using low-C hydrocarbon fuel (e.g. LPG) as a feedstock has created a viable high-energy-density technology for replacing the diesel generators and batteries used to create power in remote or mobile applications. Due to the unsurpassed volumetric energy density of liquid high-C hydrocarbon fuels and the existing infrastructure for their distribution, it is preferable to transport and store gasoline, diesel and jet fuel and catalytically crack it on-site to LPG. The ideal cracking catalyst must be capable of operating without excessively coking or being poisoned by sulfur present in the feedstock, and must be capable of being regenerated at temperatures similar to the reaction temperature, preferably using only air.

Besides electricity production, developing regions and off-grid locations demand fuels for cooking and heating. Current common fuels include charcoal, animal dung, and biowaste. All of these fuels (charcoal, animal dung, biowaste) produce harmful emissions that lead to respiratory problems and, in extreme cases, premature fatalities. Sulfur emissions from burning high-C hydrocarbon fuels preclude their use for heating and cooking. A need exists to provide clean-burning low-C hydrocarbon fuels, for heating and cooking purposes, to developing and off-grid regions.

SUMMARY

Objects and advantages of the invention will be set forth in part in the following description, or may be obvious from the description, or may be learned through practice of the invention.

Fuel converters are generally provided that are configured to convert a transportation fuel to a low-C hydrocarbon fuel, along with methods of their use. In one embodiment, the fuel converter comprises: an evaporator configured to receive a transportation fuel from a fuel tank in a liquid state, wherein the evaporator converts the transportation fuel from a liquid to a gas; a fuel burner configured to heat the evaporator; a catalyst cartridge in fluid communication with the evaporator so as to receive the gas from the evaporator; and a condenser in fluid communication with the catalyst cartridge so as to receive the reaction product mixture from the catalyst cartridge. The catalyst cartridge comprises a catalyst configured to convert the transportation fuel into a reaction product mixture comprising a low-C hydrocarbon fuel. The condenser is configured to separate the low-C hydrocarbon fuel from a condensed fuel in the reaction product mixture.

Other features and aspects of the present invention are discussed in greater detail below.

BRIEF DESCRIPTION OF THE FIGURES

A full and enabling disclosure of the present invention, including the best mode thereof to one skilled in the art, is set forth more particularly in the remainder of the specification, which includes reference to the accompanying FIGURES.

FIG. 1 shows a general schematic of an exemplary fuel converter according to one embodiment of the present invention.

DEFINITIONS

As used herein, the term "low-C hydrocarbon fuel" refers to a mixture of hydrocarbons having carbon chains that contain 2 to 5 carbon atoms per molecule, such as 2 to 4 carbon atoms per molecule, including but not limited to alkanes (e.g., ethane, propane, n-butane, iso-butane, n-pentane, iso-pentane), alkenes (e.g., ethylene, propylene, butylene), etc. LPG is an example of a low-C hydrocarbon fuel;

it is a mixture of propane and butane, but may also contain small amounts of propylene, butylene, and other low-C hydrocarbons.

Alternatively, the term "high-C hydrocarbon fuel" refers to a mixture of hydrocarbons having carbon chains that contain at least 6 (e.g., 8 to 22) carbon atoms per molecule. For example, "high-C hydrocarbon fuel" can refer to aviation fuel, jet fuel, kerosene, diesel, or gasoline.

The term "condensed fuel" refers to a mixture of hydrocarbons having carbon chains that contain at least 6 (e.g., 8 to 22) carbon atoms per molecule and have undergone one or more catalytic cracking cycles. The "condensed fuel" has very similar chemophysical properties to its parent high-C hydrocarbon fuel with the notable difference in aromatic-to-linear hydrocarbon chain ratios. "Condensed fuel" has a relatively large amount of aromatic hydrocarbons.

Chemical elements are discussed in the present disclosure using their common chemical abbreviation, as found on a periodic table of elements. For example, hydrogen is represented by its common chemical abbreviation H; helium is represented by its common chemical abbreviation He; and so forth.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

A fuel converter is generally provided that is configured to accept a transportation fuel (e.g., jet fuel, diesel, gasoline, and/or kerosene) and transform it into a LPG-like product. This transformation is generally performed via a catalytic reaction. In one particular embodiment, the fuel converter includes the following components: a fuel reservoir, a condensate reservoir, fuel pumps (e.g., peristaltic pumps), an evaporator, catalyst cartridges, a condenser, a compressor, temperature controllers, and associated plumbing.

I. Fuel Converter

Referring to FIG. 1, an exemplary fuel converter (10) is schematically shown. Generally, the fuel converter (10) includes a conversion compartment (12) heated by a fuel burner (14). The fuel burner heats the evaporator (16) and the catalyst cartridges (18) to its operating temperature (which can be independent of each other). In one particular embodiment, conversion compartment (12) is insulated to minimize heat loss therefrom. For example, one or all of the walls (13) defining the conversion compartment (12) can be insulated. For example, the conversion compartment (12) can be heated to an operating temperature of about 300° C. to about 700° C. (e.g., about 350° C. to about 550° C.). A temperature controller (19) can be present in the conversion compartment (12) to control the temperature of the fuel burner (14) and, subsequently, the evaporator (16), the catalyst cartridges (18), and the condenser (24).

In use, a pump (22) is in fluid communication with the fuel tank (20) and the evaporator (16) such that the high-C hydrocarbon fuel is pumped to the evaporator (16) from a fuel tank (20) utilizing the pump (22) (e.g., a peristaltic pump). The high-C hydrocarbon fuel is converted from a liquid state to a gaseous state in the evaporator (16), which is heated by a fuel burner (14) as stated above. The gaseous high-C hydrocarbon fuel is then piped to a catalyst cartridge (18). Within the catalyst cartridge (18), the gaseous high-C hydrocarbon fuel is at least partially converted to a low-C hydrocarbon fuel resembling LPG and a condensed fuel that resembles the transportation fuel starting material. As such, the reaction product mixture is composed of a low-C hydrocarbon fuel and a condensed fuel. In one embodiment, the condensed fuel can have a drastically different chemical composition, except for the case of gasoline, but is generally still high-C with the ratios of aliphatic molecules to aromatic molecules being very different.

The reaction product mixture exiting the catalyst cartridge (18) as a result of the catalytic conversion reaction is piped to a condenser (24) to separate the heavier hydrocarbons (e.g., the condensed fuel) from the lighter hydrocarbons (e.g., the low-C hydrocarbon fuel). As shown, valves (23) can be present between the individual catalyst cartridges (18) and condenser (24) to control and/or measure the flow of the reaction product mixture therethrough.

A condenser (24) is generally configured to collect and cool the reaction product mixture exiting each catalyst cartridge (18). In one embodiment, the condenser (24) is configured to cool the reaction product mixture to a temperature that liquefies the condensed fuel while keeping the low-C hydrocarbon fuel in a gaseous state. As such, upon cooling to the condenser temperature, the condensed fuel can be collected as a liquid product in the condenser (24) and the low-C hydrocarbon fuel can be collected as a gaseous product in the condenser (24). As shown, the gaseous product is collected from the top of the condenser (24) and piped away as a reaction product, and the liquid product is collected from the bottom reservoir of condenser 24 and piped away as a by-product.

The condenser (24) is generally operated at a condensing temperature that is less than the operating temperature within the conversion compartment (12). For example, the condenser (24) is, in particular embodiments, operated at a condensing temperature of about −10° C. to about 35° C. (e.g., about −3° C. to about 25° C.). In one embodiment, for example, the condenser (24) can be cooled by Peltier cooling pads.

In one embodiment, the gaseous product is piped from the condenser (24) to a compressor (26) where it is pressurized into a liquid fuel. As such, the gaseous product from the condenser (24) is converted to a LPG product, which can be collected from the compressor (26), such as into a collection system/tank (44). Generally, the LPG product comprises low-C hydrocarbon fuel.

In one particular embodiment, the low-C hydrocarbon fuel product collected from the compressor (26) can include hydrocarbons having 2 to 5 carbons per molecule. For example, the low-C hydrocarbon fuel can include a mixture of various concentrations of any or all of the following components: ethylene, ethane, propylene, propane, 1-butene, n-butane, iso-butane, n-pentane, iso-pentene, etc. In one particular embodiment, at least 50% of the low-C hydrocarbon fuel can be hydrocarbons having 3 carbons (e.g., propane).

On the other hand, the condensed fuel collected from the bottom of the condenser (24) (i.e., the larger hydrocarbons resembling the transportation fuel starting material (e.g., high-C hydrocarbon fuel)) can be optionally collected in a storage tank (28), recycled through the catalytic cracking process, and/or pumped into a fuel burner (14) for combustion thereof (i.e., collectively forming a return system (42)). In the embodiment where the condensed fuel is returned to the fuel tank (20), the condensed fuel does not significantly change the operational properties of the transportation fuel therein. Thus, any condensed fuel can be sent through the fuel converter (10) or used in its normal manner (e.g., burning in an internal combustion engine). Thus, no true waste stream is generated by the operation of the fuel converter (10).

In the embodiment shown, a fuel burner (14) is operated from the transportation fuel piped from fuel tank (20) via a pump (15). Thus, the fuel converter (10) can be independently operated from any separate fuel source.

A user-interfaced controller (30) is shown associated with the fuel converter (10) and can be configured to control, independently, pumps and valves ((15), (17) and (22), (23), respectively). The controller (30) can also process any measurements taken by a mass flow controller (40) at any of these pump (15), pump (22), valve (17), and valve (23), or any other location in the plumbing of fuel converter (10). As such, controller (30) can optimize the operational conditions of the fuel converter (10) as desired. A power supply (32) is shown in operational connection to the controller (30), pumps, and controllers within the fuel converter (10).

Flow of the gaseous transportation fuel from the evaporator (16) to the individual catalyst cartridges (18) is, in one embodiment, controlled via valves (17). In one embodiment, flow to the individual catalyst cartridges (18) is staggered. That is, one of the valves (17) can be closed to prevent flow to one of the catalyst cartridges (18), while the other valves (17) remain open to allow flow to the other catalyst cartridges (18). As such, the flow of the gaseous transportation fuel from the evaporator (16) can be individually controlled to each of the catalyst cartridges (18) such that a continuous conversion process to be performed by the fuel converter (10) while still allowing each individual catalyst cartridge (18) to be recharged.

Optionally, an air separator/vacuum pump (34) can be included in the fuel converter (10). The air separator/vacuum pump (34) can be utilized to purge the system from air through opening/closing of appropriate valves and/or supply air to the fuel burner (14) to control its temperature. In one embodiment, for example, air can be introduced into the system to clean (e.g., oxidize) the evaporator (16) and/or catalyst cartridges (18). Such cleaning would be performed without any fuel flowing through the system. After cleaning, the system can be purged from oxygen (e.g., via a vacuum and/or inert gas), and the fuel conversion process can be reinitiated.

In summary, the fuel converter (10) requires only transportation fuel and air as inputs, with air being supplied to the system only to regenerate the deactivated (coked) catalyst. Additionally, in one embodiment, the system can rely on 120 VAC electricity or an on-board to power the pumps, condenser, temperature controllers, and compressor. As such, the fuel converter provides fuel diversification at the point of use while leveraging current distribution infrastructures.

II. Catalytic Reaction

As stated, the fuel converter (10) includes at least one catalyst cartridge (18) that includes a catalyst configured to convert transportation fuels into LPG without the need for other chemical inputs. Although shown including four catalyst cartridges (18) in the exemplary fuel converter (10), it is to be understood that any number of catalyst cartridges (18) can be included within the fuel converter (10) as desired.

Each catalyst cartridge (18) can convert the transportation fuel input to low-C hydrocarbon fuel through a catalytic reaction. Catalysts included in the catalyst cartridges (18), according to particular embodiments of the present invention, comprise aluminosilicate materials known as zeolites with mordenite framework inverted (MFI) or faujasite structure.

Zeolite materials are high surface area supports that have a high activity for many reforming reactions. In one particular embodiment, the zeolite material can be a mixture of alumina and silica having a Si/Al ratio selected to control the total acidity as well as acid site strength. Such zeolites can be prepared by mixing an aluminum source (e.g., sodium aluminate) and a silicon source (e.g., sodium silicate), followed by controlled crystallization, usually in the presence of a structure-directing agent. Syntheses often must be prepared in hydrothermal conditions at elevated pressure. They can also be easily cation exchanged. Variation of the alumina and silica contents can alter the properties of these materials and tailor their activity for different reactions. Specifically, activity and stability of the catalysts are affected by the silica-to-alumina molar ratio (or silicon-to-aluminum molar ratio) present in the structure. In particular embodiments, the silica-to-alumina molar ratio can be from about 20 to about 200.

The catalytic material can also include a relatively small amount of a transition or rare earth metal or a combination of those metals (e.g., transition-transition or rare earth-rare earth or transition-rare earth metals). Incorporation of various metal atoms into the framework of these materials via an ion-exchange process or impregnation process can yield improved performance. For example, metal atoms doped in this way can include aluminum (Al), cerium (Ce), copper (Cu), europium (Eu), iron (Fe), gallium (Ga), gadolinium (Gd), indium (In), iridium (Ir), lanthanum (La), sodium (Na), neodymium (Nd), nickel (Ni), palladium (Pd), praseodymium (Pr), platinum (Pt), rhodium (Rh), ruthenium (Ru), samarium (Sm), zinc (Zn), zirconium (Zr), or mixtures thereof. The precious metal(s) can be included in the catalytic material in a weight percent of about 0.1% to about 10% of the total weight of the catalytic material (e.g., the weight of the zeolite(s) and the precious metal(s)). For instance, in particular embodiments the metal(s) can be included in the catalytic material in a weight percent of about 0.1% to about 10% of the total weight of the catalytic material.

In one embodiment, the presently disclosed methods are especially useful for the conversion of sulfur-containing transportation fuel because the methods do not require desulfurization of the fuel. In particular, the fuel does not need to be desulfurized before reaching the catalyst. That is, the sulfur-containing molecules remain inert over the catalyst and can be collected in the condensed fuel, separated from the product low-C hydrocarbon fuel. For example, the sulfur content in the low-C hydrocarbon fuel can be less than 100 ppm, such as less than 50 ppm.

The conversion efficiency of high-C hydrocarbons to low-C hydrocarbons can be up to 50%, on a single pass calculated on a mass basis (i.e., kg of low-C hydrocarbons out per kg of high-C hydrocarbons (e.g., JP-8) in). However, it is envisioned that higher conversion efficiencies may be realized through optimization of the conversion parameters (e.g., the reactor conditions and space velocity, etc.).

The reaction proceeds in a continuous manner with inflow of high-C hydrocarbon fuel and outflow of a product stream containing the low-C hydrocarbon fuel. The reaction occurs near atmospheric pressure (e.g., within about 100 mmHg of 760 mmHg) and can reach steady state in a short amount of time (e.g., less than about 15 minutes). In one particular embodiment, additional catalyst cartridges (18) can be used to recycle the feed stream to increase the production of LPG with up to 70% efficiency, while supplying up to about 0.3 kg/hr of LPG.

In certain embodiments, catalyst cartridges (18) are designed to operate for about 6 hours to about 20 hours (e.g., about 8 hours to about 15 hours, such as about 10 hours) and then be regenerated thermally (e.g., via heating for a sufficient time, such as about 30 minutes to about 5 hours, such as about one hour) for subsequent runs. Catalyst cartridges can handle a wide range of sulfur content (up to 5,000 ppm) in JP-8 from different countries and regions.

Particularly suitable catalysts for use in the system are described in U.S. patent application Ser. No. 13/584,180 (U.S. Publication No. 2013/0041198) of Lauterbach, et al. titled "Highly Active Decomposition Catalyst for Low Carbon Hydrocarbon Production from Sulfur Containing Fuel" filed on Aug. 13, 2012, which is incorporated by reference herein.

Example

A prototype was made according to the schematic of FIG. 1. The prototype measured 8 cubic feet and has the following components: fuel reservoir, condensate reservoir, peristaltic pumps, evaporator, reactor with proprietary catalyst, condenser, compressor, temperature controllers, and associated plumbing.

The system's reactant feed flexibility, its strongest attribute, makes it appealing to both civilian and military applications. The system can consume any of the most popular fuels used in transportation, heating, and electricity production while supplying fuel for portable power devices including fuel cells, burners, refrigerators, stoves, and lamps. As an enabling technology, the novel system opens the possibilities for in-field fuel cell use, thus leveraging the fuel cell benefits of increased power and energy density over batteries and adding diversity over generators. Because no comparable product exists in the market, our product is uniquely poised to attract market interests away from existing portable power sources.

As a portable device itself, the fuel converter can be loaded onto vehicles and even carried by one person. The compact design of the system improves its mobility and thus its versatility for field use. Current dimensions, without optimization, measure approximately 20"×20"×24" and produces 60 $g_{LPG}$/hr. Such a compact system has large implications for portable and diverse fuels for civilian and military operations.

These and other modifications and variations to the present invention may be practiced by those of ordinary skill in the art, without departing from the spirit and scope of the present invention, which is more particularly set forth in the appended claims. In addition, it should be understood that the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A fuel converter comprising:
   an evaporator configured to receive a transportation fuel from a fuel tank in a liquid state, wherein the evaporator converts the transportation fuel from a liquid to a gas;
   a fuel burner configured to heat the evaporator;
   a plurality of catalyst cartridges in fluid communication with the evaporator so as to receive the gas from the evaporator, wherein each catalyst cartridge comprises a catalyst configured to convert the transportation fuel into a reaction product mixture comprising a low-C hydrocarbon fuel, wherein the evaporator, the fuel burner, and the plurality of catalyst cartridges are contained within a section of walls, wherein one or more of the walls are insulated;
   a condenser in fluid communication with each of the catalyst cartridges so as to receive the reaction product mixture from the catalyst cartridges, wherein the condenser is configured to separate the low-C hydrocarbon fuel from a condensed fuel in the reaction product mixture, wherein the condenser is operated at a condensing temperature of about −10° C. to about 35° C.;
   a return system configured to return the condensed fuel from the condenser to the fuel tank or to the evaporator; and
   a collection system configured to collect the low-C hydrocarbon fuel from the condenser.

2. The fuel converter of claim 1, wherein the return system is configured to return the condensed fuel to the fuel tank.

3. The fuel converter of claim 1, wherein the return system is configured to return the condensed fuel to the evaporator.

4. The fuel converter of claim 1, further comprising:
   a pump in fluid communication with the fuel tank and the evaporator such that the high-C hydrocarbon fuel is pumped to the evaporator from a fuel tank.

5. The fuel converter of claim 4, wherein the pump is a peristaltic pump.

6. The fuel converter of claim 1, wherein the high-C hydrocarbon fuel is converted from a liquid state to a gaseous state in the evaporator heated by the fuel burner.

7. The fuel converter of claim 1, wherein each catalyst cartridge is individually piped to the evaporator.

8. The fuel converter of claim 7, wherein a valve is present between the evaporator and each catalyst cartridge such that the flow from the evaporator to each catalyst cartridge is individually controlled.

9. The fuel converter of claim 8, wherein each catalyst cartridge is configured to operate for a specified time, and then be regenerated thermally.

10. The fuel converter of claim 9, wherein each catalyst cartridge is configured to operate for a specified time of about 6 hours to about 20 hours.

11. The fuel converter of claim 10, wherein each catalyst cartridge is configured to be regenerated thermally via heating for about 30 minutes to about 5 hours.

12. The fuel converter of claim 8, wherein each catalyst cartridge is individually piped to the condenser.

13. The fuel converter of claim 1, wherein the condenser is configured to cool the reaction product mixture to a temperature that liquefies the condensed fuel while keeping the low-C hydrocarbon fuel in a gaseous state.

14. The fuel converter of claim 13, wherein the gaseous product is collected from the top of the condenser and piped to the collection system as a reaction product.

15. The fuel converter of claim 14, wherein the liquid product is collected from the bottom reservoir of condenser and piped via the return system to the fuel tank or to the evaporator.

16. The fuel converter of claim 15, wherein the gaseous product is piped from the condenser to a compressor where it is pressurized into a liquid fuel within the collection system.

17. The fuel converter of claim 1, wherein the fuel converter is a portable device.

18. The fuel converter of claim 1, wherein the fuel converter has a compact design.

19. The fuel converter of claim 1, wherein the fuel converter has dimensions of approximately 20 inches by 20 inches by 24 inches.

* * * * *